United States Patent
Lee (10) Patent No.: US 6,199,824 B1
(45) Date of Patent: Mar. 13, 2001

(54) SPHERICAL VALVE

(76) Inventor: Jen-Chieh Lee, 47-2, Ju-Yi Rd., Hsi-Chi Li, Ta Chia Township, Taichung Hsien (TW)

( * ) Notice: Subject to any disclaimer, the term of this patent is extended or adjusted under 35 U.S.C. 154(b) by 0 days.

(21) Appl. No.: 09/670,321

(22) Filed: Sep. 27, 2000

(51) Int. Cl.[7] .................................................. F16K 5/06
(52) U.S. Cl. ............................ 251/315.1; 251/315.01; 251/315.16
(58) Field of Search ................................. 251/304, 309, 251/310, 315.01, 315.09, 315.1, 315.12, 315.13, 315.16

(56) References Cited

U.S. PATENT DOCUMENTS

| | | | |
|---|---|---|---|
| 3,118,650 | * | 1/1964 | Cooper et al. ........................ 251/315 |
| 3,345,032 | * | 10/1967 | Rawstron ............................... 251/315 |
| 3,370,612 | * | 2/1968 | Holl ....................................... 251/315 |
| 3,949,965 | * | 4/1976 | Sharples et al. ...................... 251/315 |
| 5,036,883 | * | 8/1991 | McHugh ............................... 251/315 |
| 5,531,244 | * | 7/1996 | Siver ................................. 251/315.16 |

* cited by examiner

Primary Examiner—Kevin Shaver
Assistant Examiner—D A Bonderer
(74) Attorney, Agent, or Firm—Harrison & Egbert (57) ABSTRACT

A spherical valve is formed of a main body, a cover, and a spherical body. The main body is of a hollow construction and is provided in the interior with a partition dividing the interior into an inner receiving cell and an outer receiving cell. The main body is provided at both ends with a threaded tubular portion in communication with the inner and the outer receiving cells. The cover is provided in the inner side with an annular body having an annular clamp seat. The spherical body is located between the main body and the cover and is provided in the interior with an L-shaped channel to be oriented in accordance with the opening and the closing of the spherical valve.

4 Claims, 13 Drawing Sheets

SPHERICAL VALVE

BACKGROUND OF THE INVENTION

1. Field of the Invention

The present invention relates generally to a valve, and more particularly to a spherical valve.

2. Description of Related Art

Figure 1:
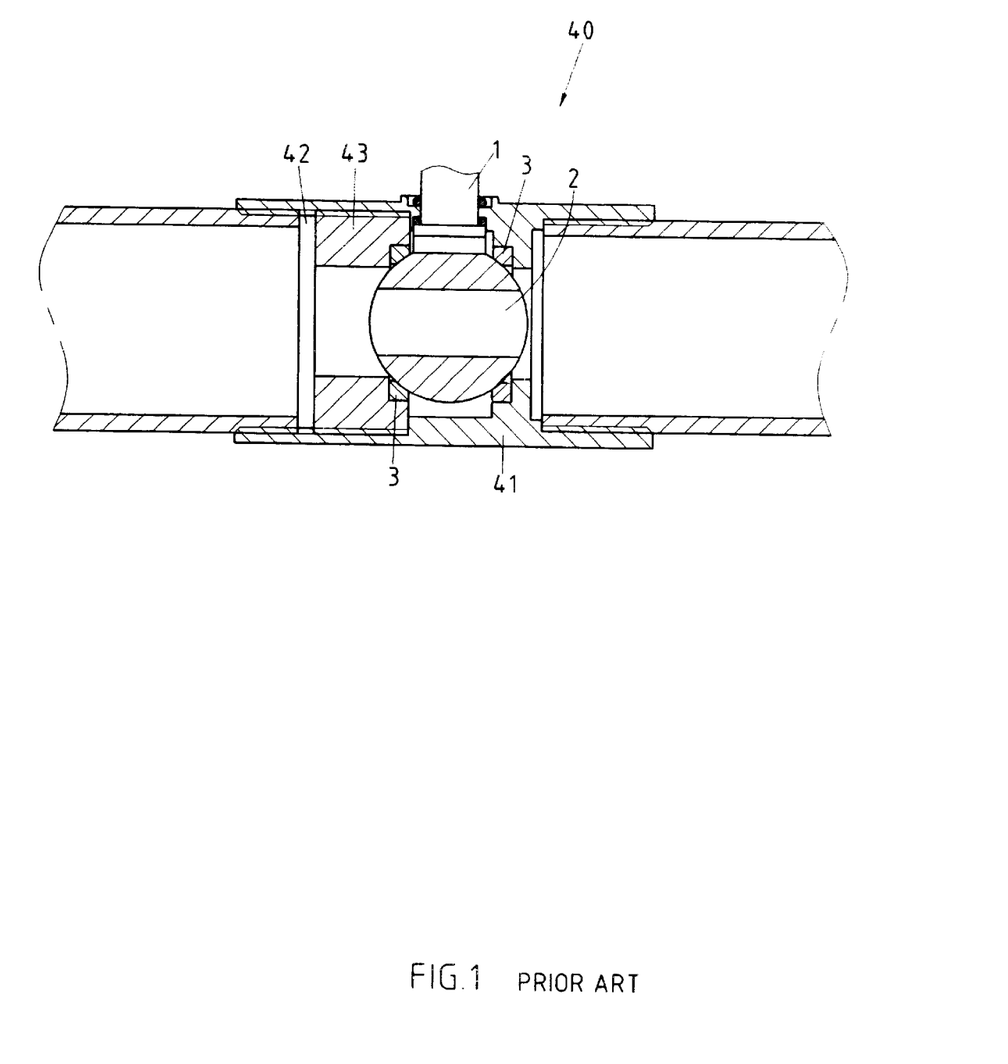
FIG. 1 shows a sectional view of an integrally-made spherical valve of the prior art.
Figure 2:
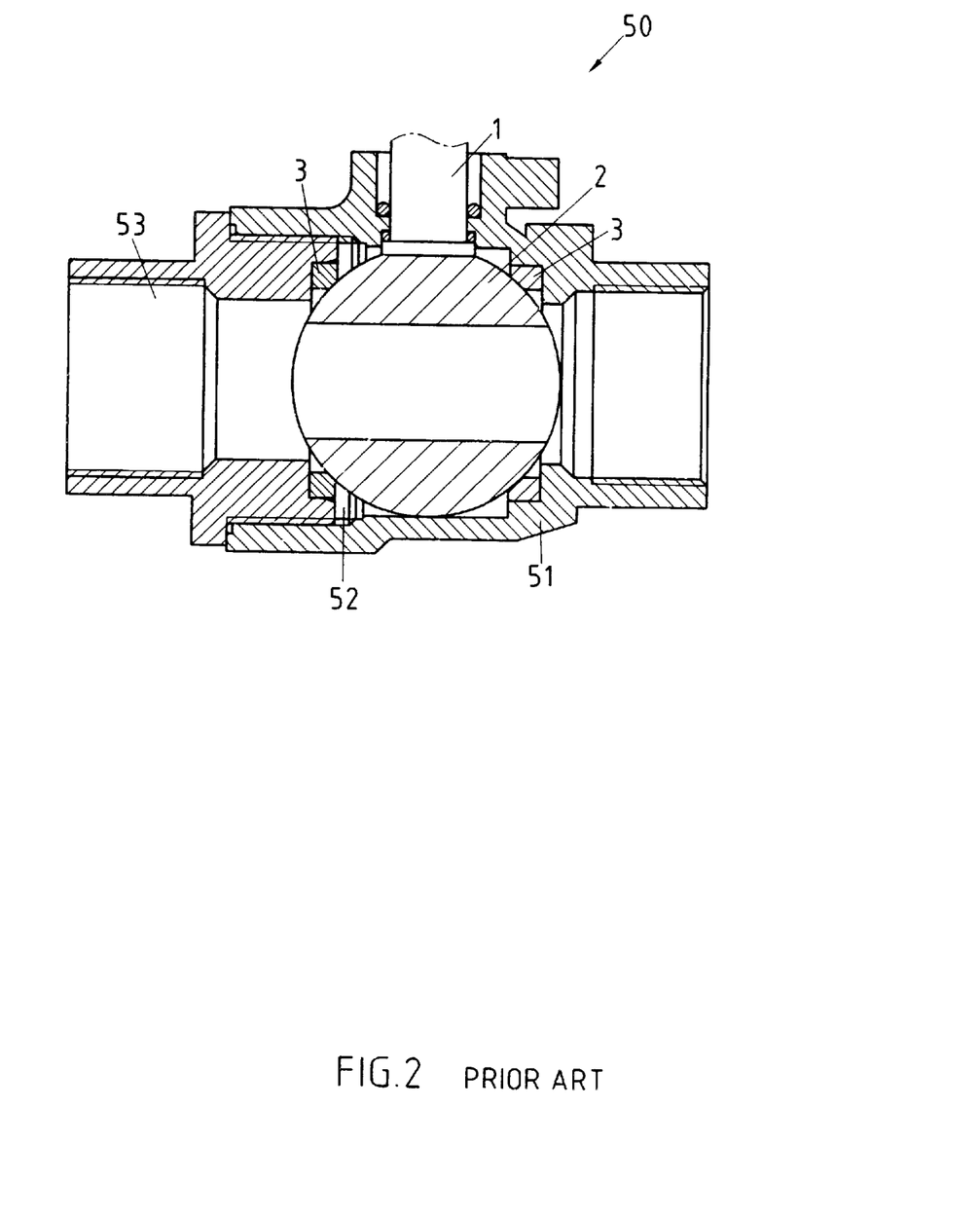
FIG. 2 shows a sectional view of a two-piece ball valve of the prior art.
Figure 3:
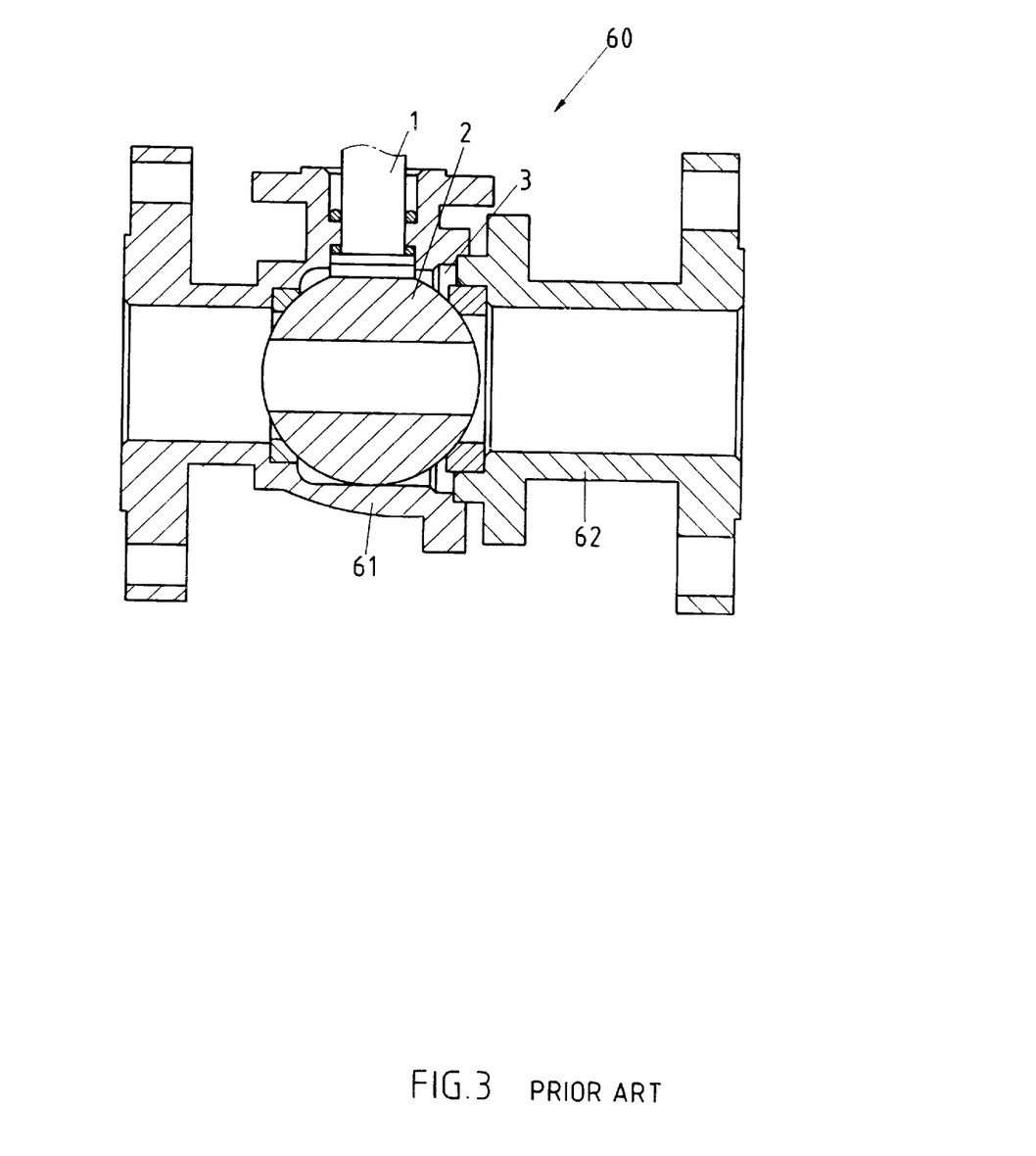
FIG. 3 shows a sectional view of a flanged ball valve of the prior art.
Figure 4:
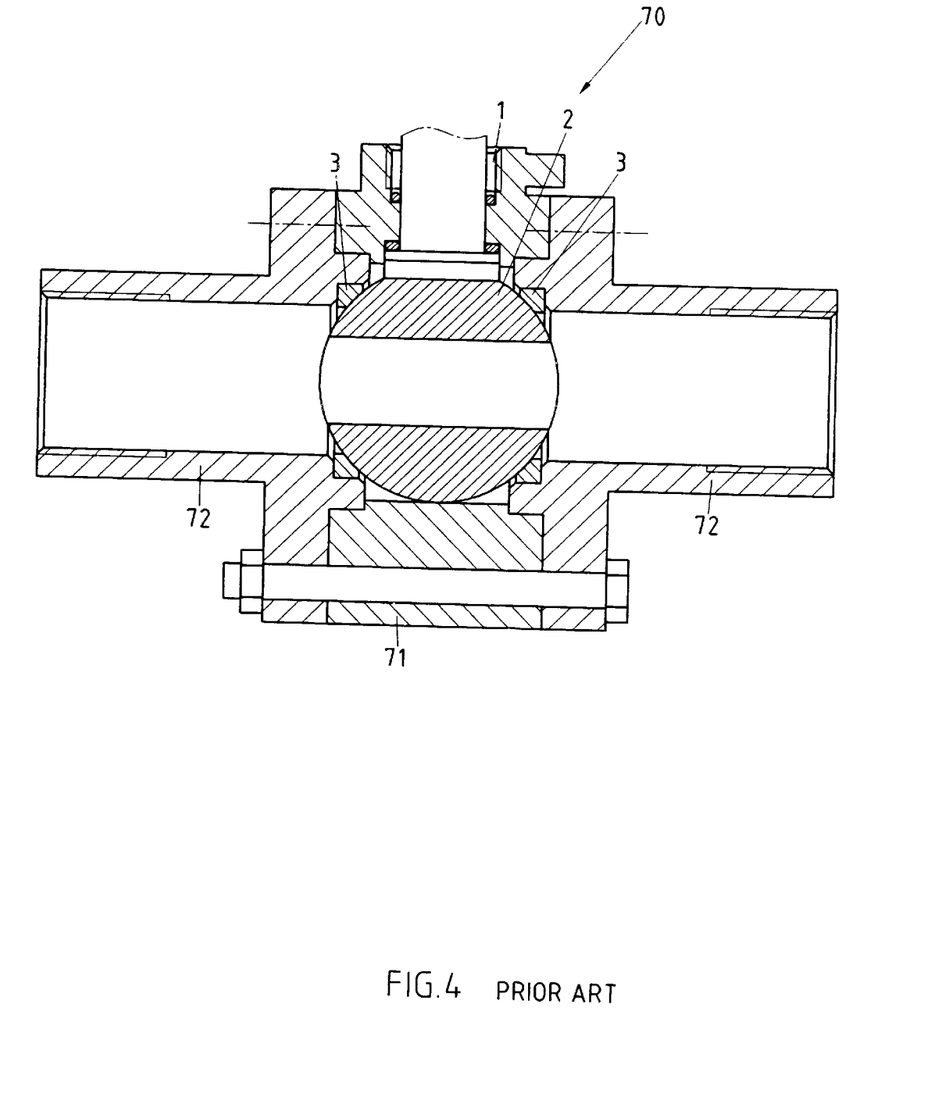
FIG. 4 shows a sectional view of a three-piece ball valve of the prior art.
Figure 5:
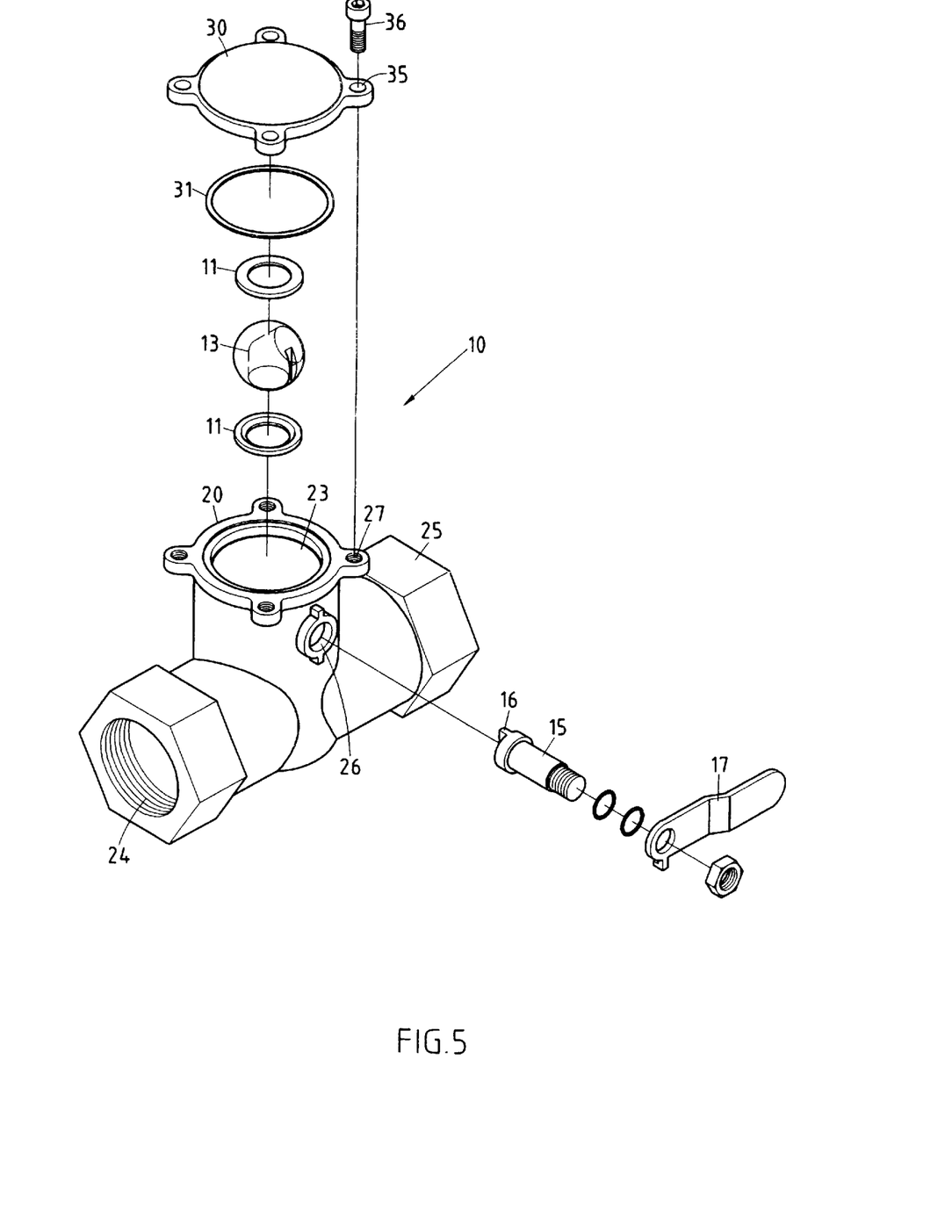
FIG. 5 shows an exploded view of a spherical valve of the present invention.
Figure 6:
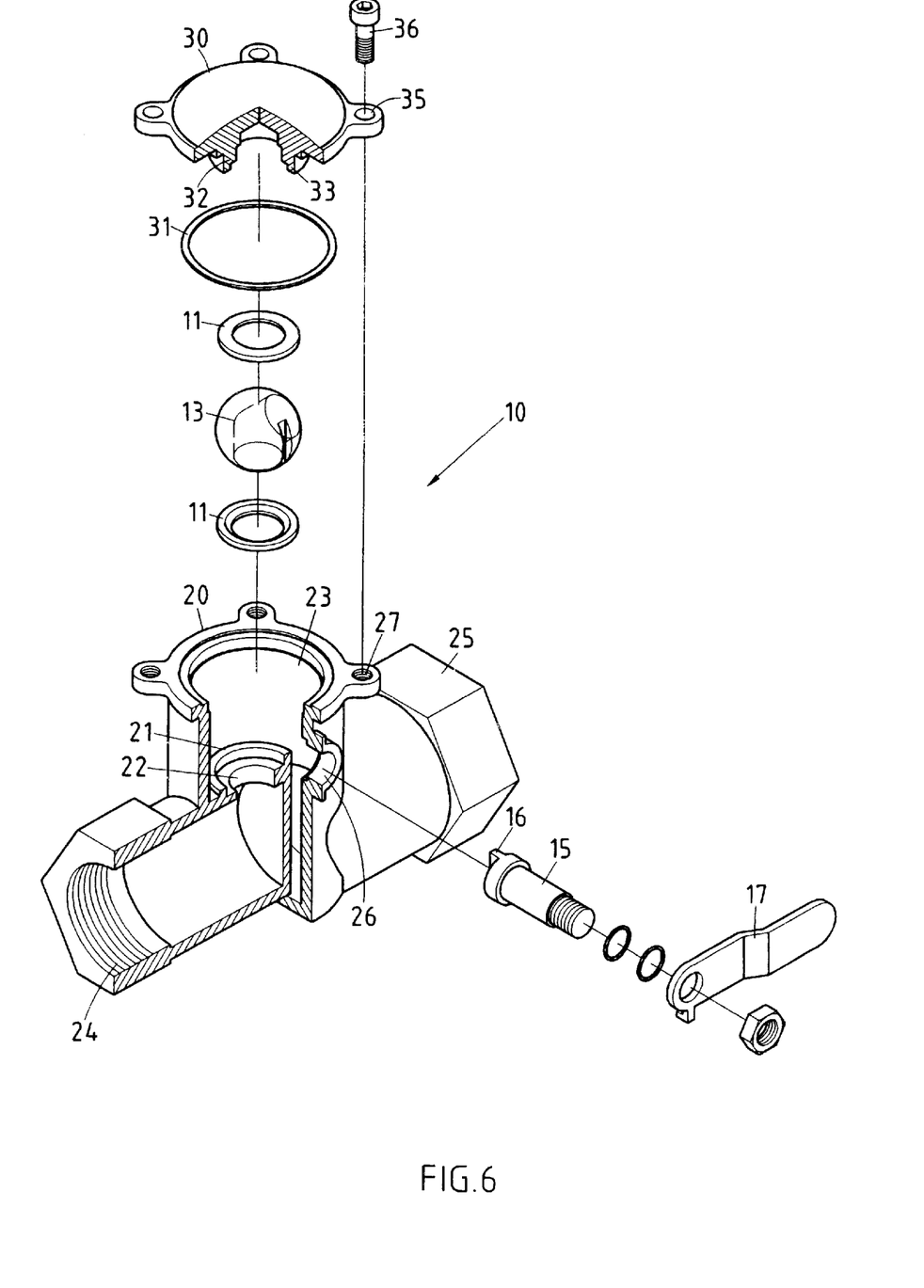
FIG. 6 shows a sectionally-exploded view of the spherical valve of the present invention.
Figure 7:
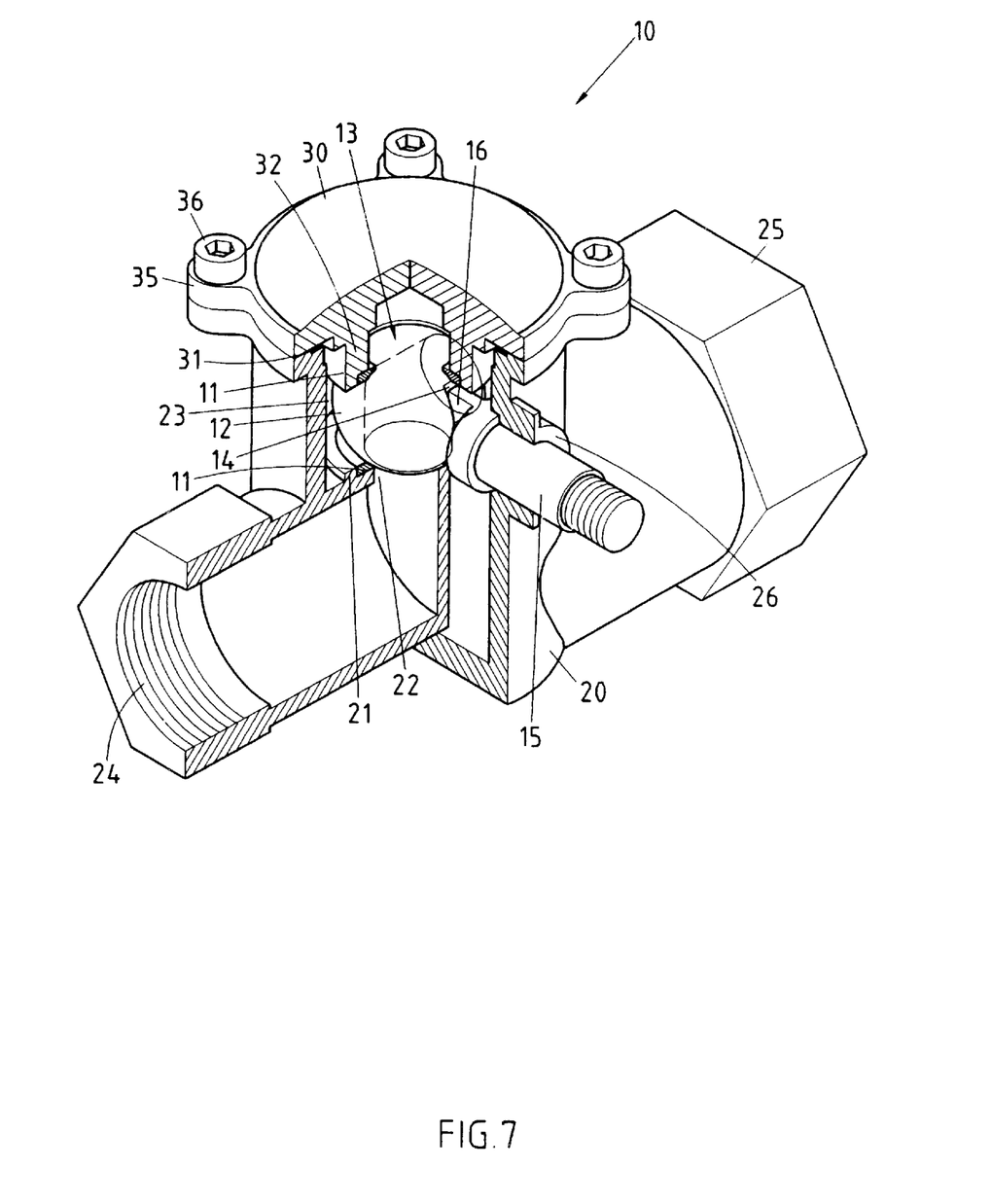
FIG. 7 shows a sectional view of the spherical valve of the present invention.
Figure 8:
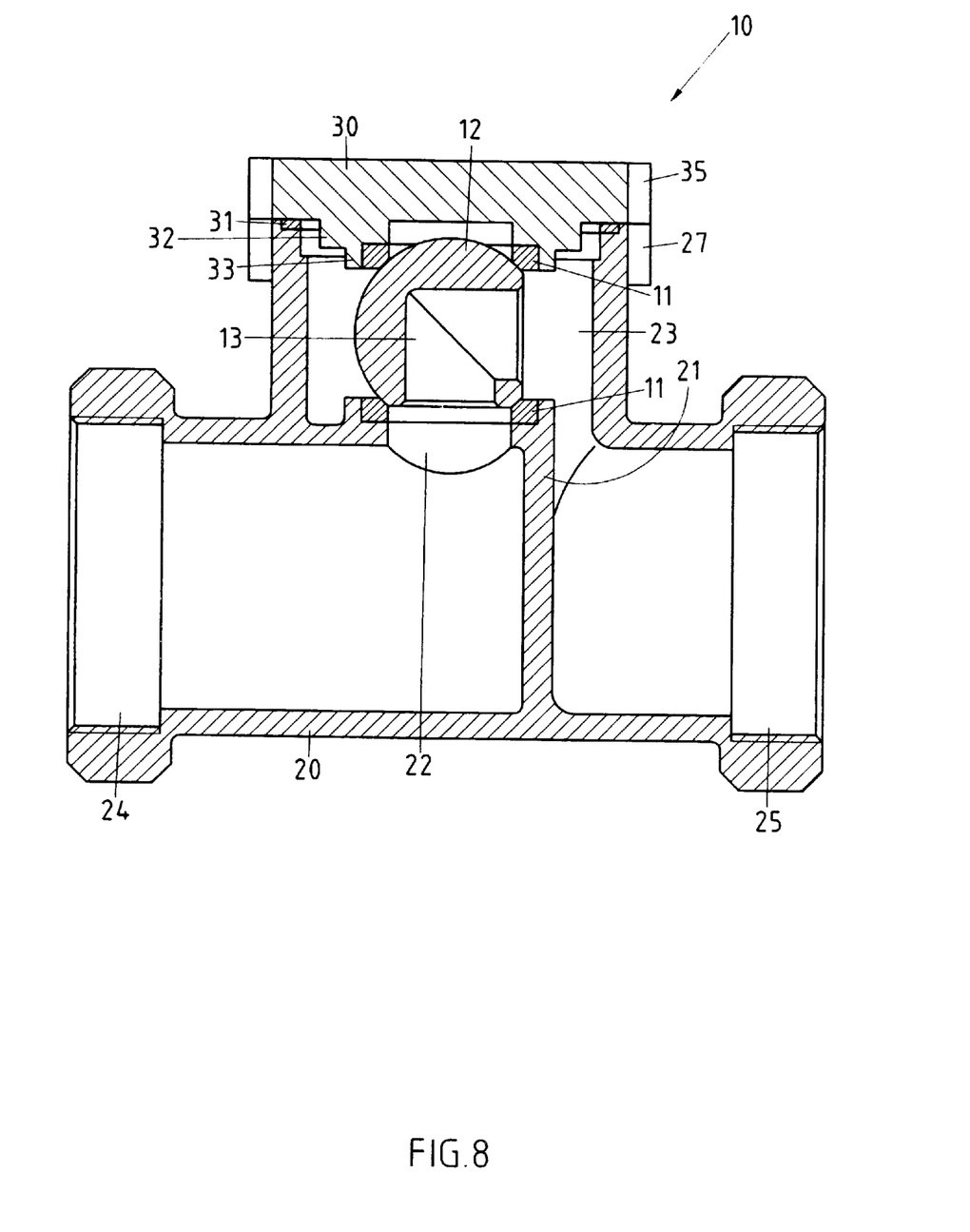
FIG. 8 shows a sectional plan view of the spherical valve of the present invention.
Figure 9:
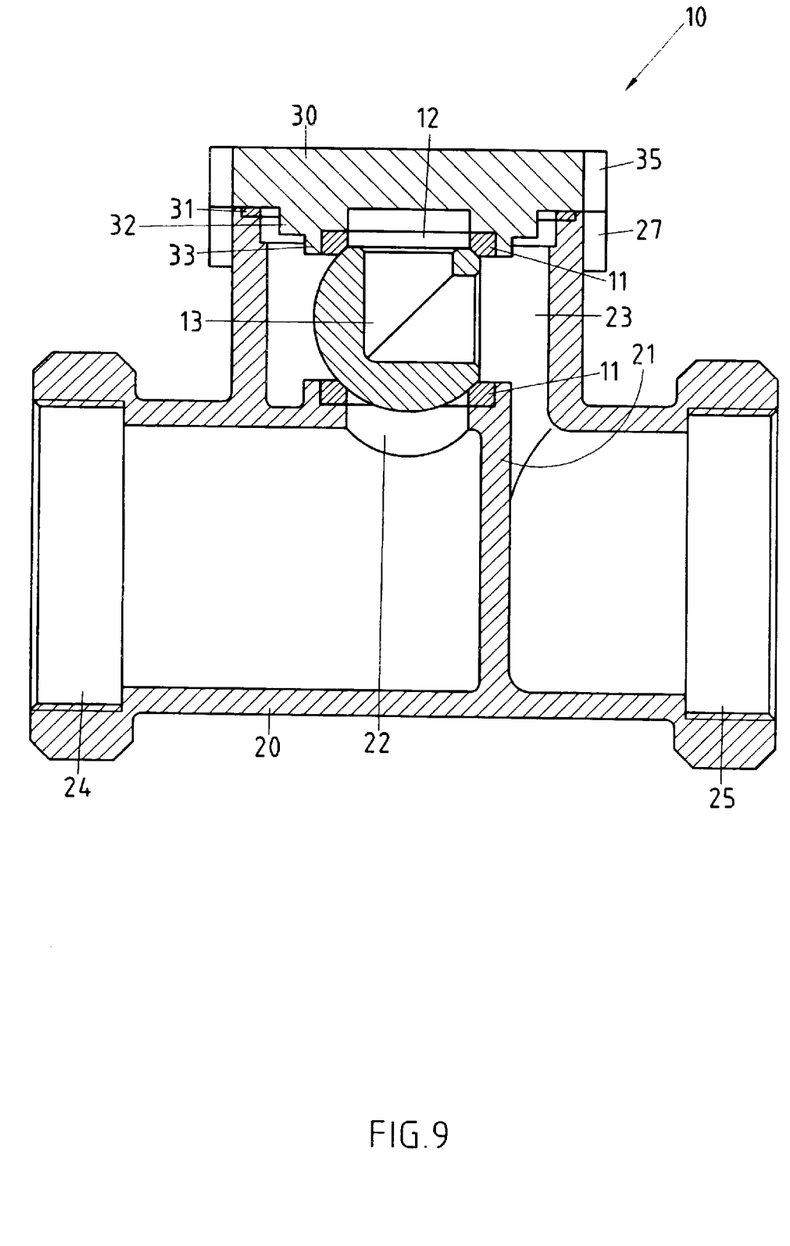
FIG. 9 shows a schematic view of the spherical valve of the present invention in the closed state.

As shown in FIG. 1, a prior art spherical valve 40 has a tubular body 41 which is provided in the interior with a threaded portion 42, a rotary shaft 1, a ball 2, a washer 3, and an annular lock member 43. The spherical valve 40 is defective in design because it is fastened to a pipe in a specific direction, and because it cannot be easily detached from the pipe for maintenance work. As shown in FIG. 2, another prior art ball valve 50 has a tubular body 51 which is provided in the interior thereof with a threaded port 52, a rotary shaft 1, a ball 2, and a washer 3. A threaded tubular member 53 is fastened to the threaded port 52. As compared with the prior art spherical valve 40, the prior art ball valve 50 can be fastened to a pipe with a relative ease. However, the ball valve 50 cannot be easily maintained or replaced. As shown in FIG. 3, a flanged ball valve 60 of the prior art is formed of a primary tubular member 61 and a secondary tubular member 62, which make the repairing and the replacing of the flanged ball valve 60 rather complicated and time-consuming. As shown in FIG. 4, a three-piece ball valve 70 of the prior art has a main body 71, which is fastened to a pipe by two auxiliary valve tubes 72 and is unfastened the pipe between the two auxiliary valve tubes 72, thereby making the assembly work cumbersome. In addition, the ball valve 70 is complicated in construction and is expensive.

BRIEF SUMMARY OF THE INVENTION

The primary objective of the present invention is to provide a spherical valve free of the deficiencies of the prior art ball valves described above.

The features and the advantages of the present invention will be readily understood upon a thoughtful deliberation of the following detailed description of the present invention with reference to the accompanying drawings.

DETAILED DESCRIPTION OF THE INVENTION

As shown in FIGS. 5–8, a spherical valve 10 of the present invention comprises a main body 20, a cover 30, and a spherical body 12.

The main body 20 is of a hollow construction and is provided in the interior with a partition 21 which divides the interior into an inner annular seat 22 and an outer receiving cell 23. The main body 20 is provided at one end with a threaded tube 24 in communication with the inner annular seat 22 via the outer receiving cell 23. The main body 20 is further provided at another end with a threaded tubular portion 25 in communication with the outer receiving cell 23. The main body 20 is further provided in one side thereof with a shaft tube 26 which is in communication with the outer receiving cell 23 for pivoting a rotary shaft member 15. The main body 20 is provided along the brim of the outer receiving cell 23 with a plurality of lugs 27, with each having a threaded through hole.

The cover 30 corresponds in shape to the outer receiving cell 23 and is provided thereunder with a washer 31. The cover 30 is further provided in the underside thereof with an annular body 32 extending therefrom and having an annular clamp seat 33. The cover 30 is further provided in the periphery thereof with a plurality of lugs 35 corresponding in location to the lugs 27 of the main body 20. The lugs 35 are provided with a through hole. The cover 30 is joined with the outer receiving cell 23 by a plurality of fastening bolts 36 which are engaged with the threaded through holes of the lugs 27 via the through holes of the lugs 35 of the cover 30.

The spherical body 12 is provided in the interior with an L-shaped channel 13. The spherical body 12 is located between two washers 11 and is provided in the periphery with a retaining slot 14 in which a rib 16 of the rotary shaft member 15 is retained. The rotary shaft member 15 is fastened at the outer end to a rotary handle 17 by which the rotary shaft member 15 is actuated in such a manner that the channel 13 of the spherical body 12 is oriented to facilitate the opening or the closing of the spherical valve 10 of the present invention.

Figure 10:
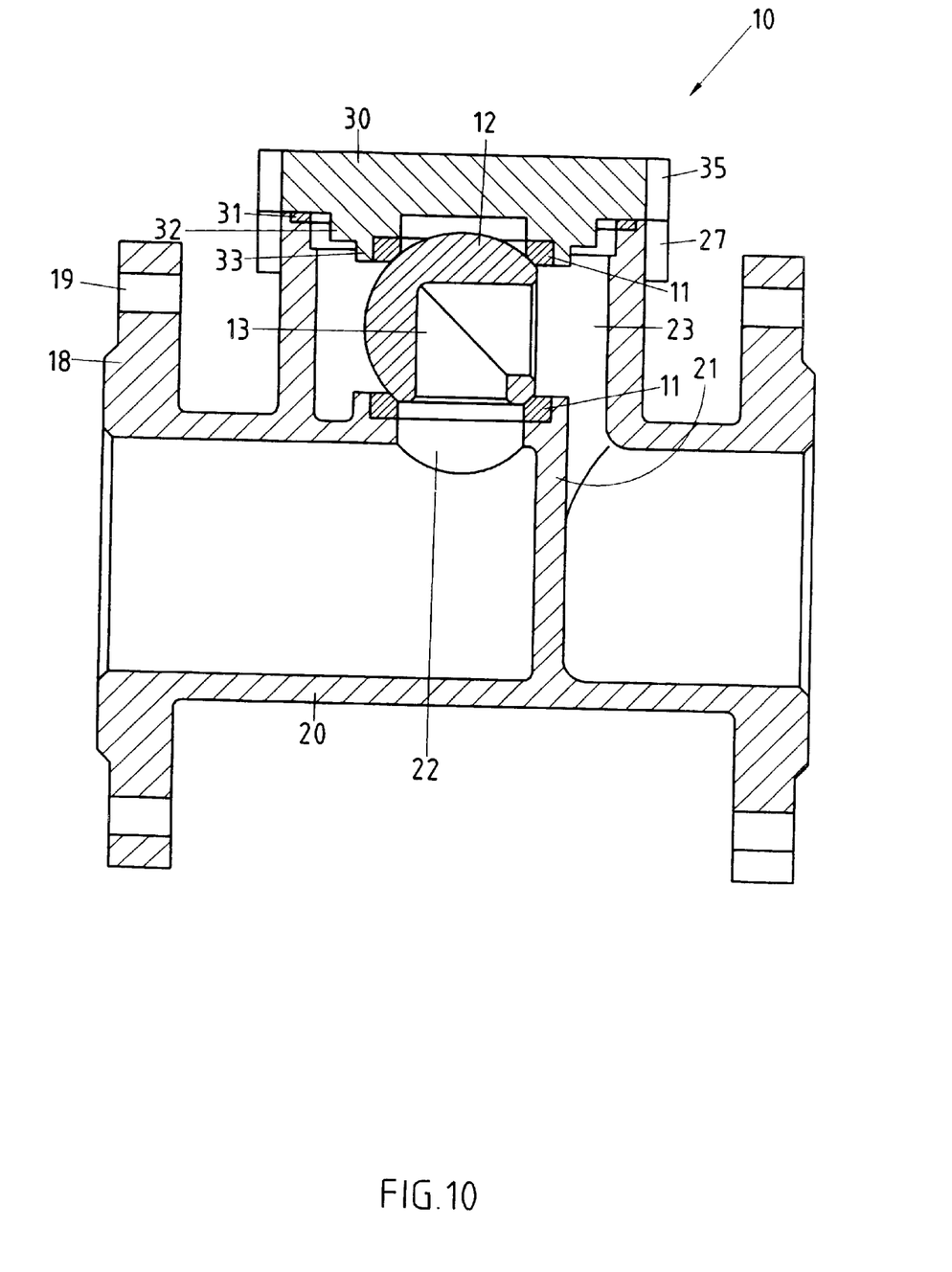
FIG. 10 shows a sectional plan view of a first embodiment of the present invention.

As shown in FIG. 10, the main body 20 of the present invention is provided with two plate portions 18 in place of the threaded tubular portions 24 and 25. The plate portions 18 are provided with a bolt hole 19. In light of the plate portions 18, the spherical valve 10 of the present invention can be easily fastened or unfastened to a pipe line.

Figure 11:
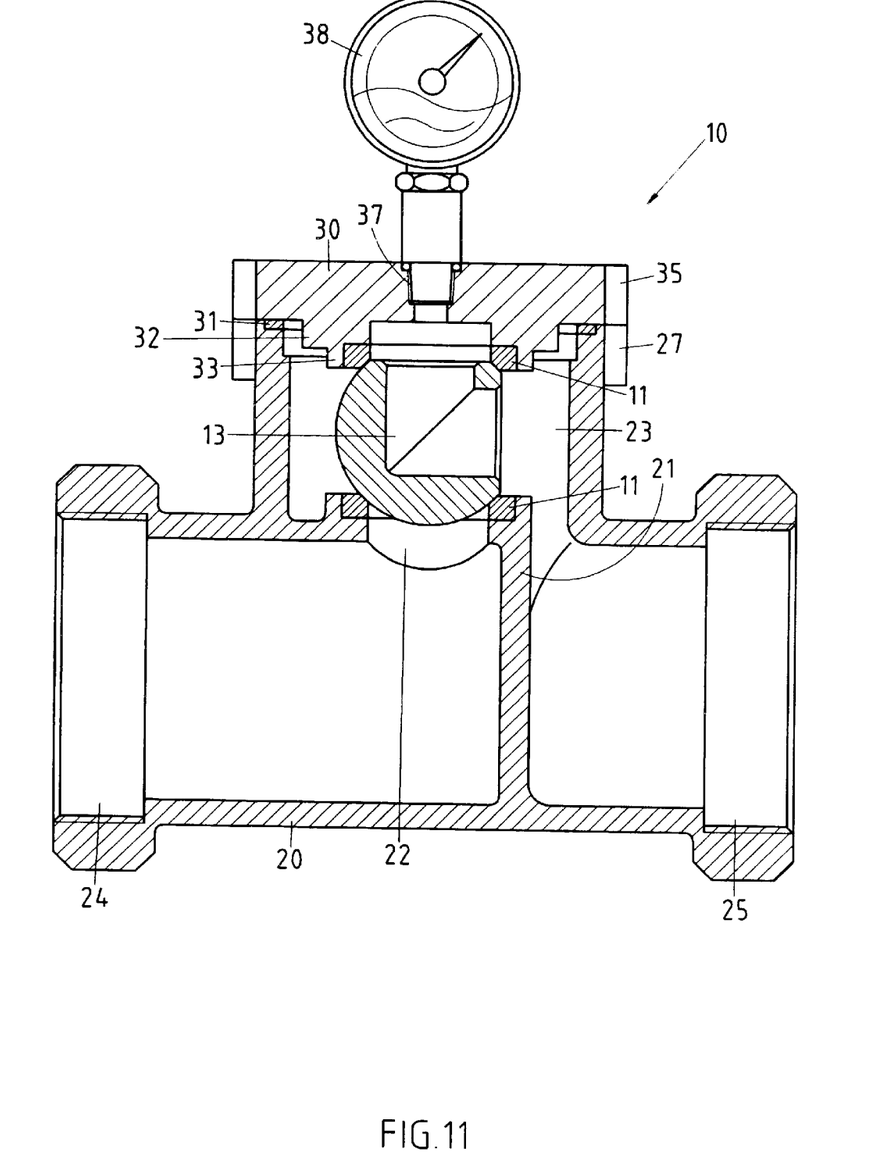
FIG. 11 shows a sectional plan view of a second embodiment of the present invention.

As shown in FIG. 11, the cover 30 is provided with a guide hole 37 for setting up a pressure gauge 38 by which the pressure in the spherical valve 10 is monitored.

Figure 12:
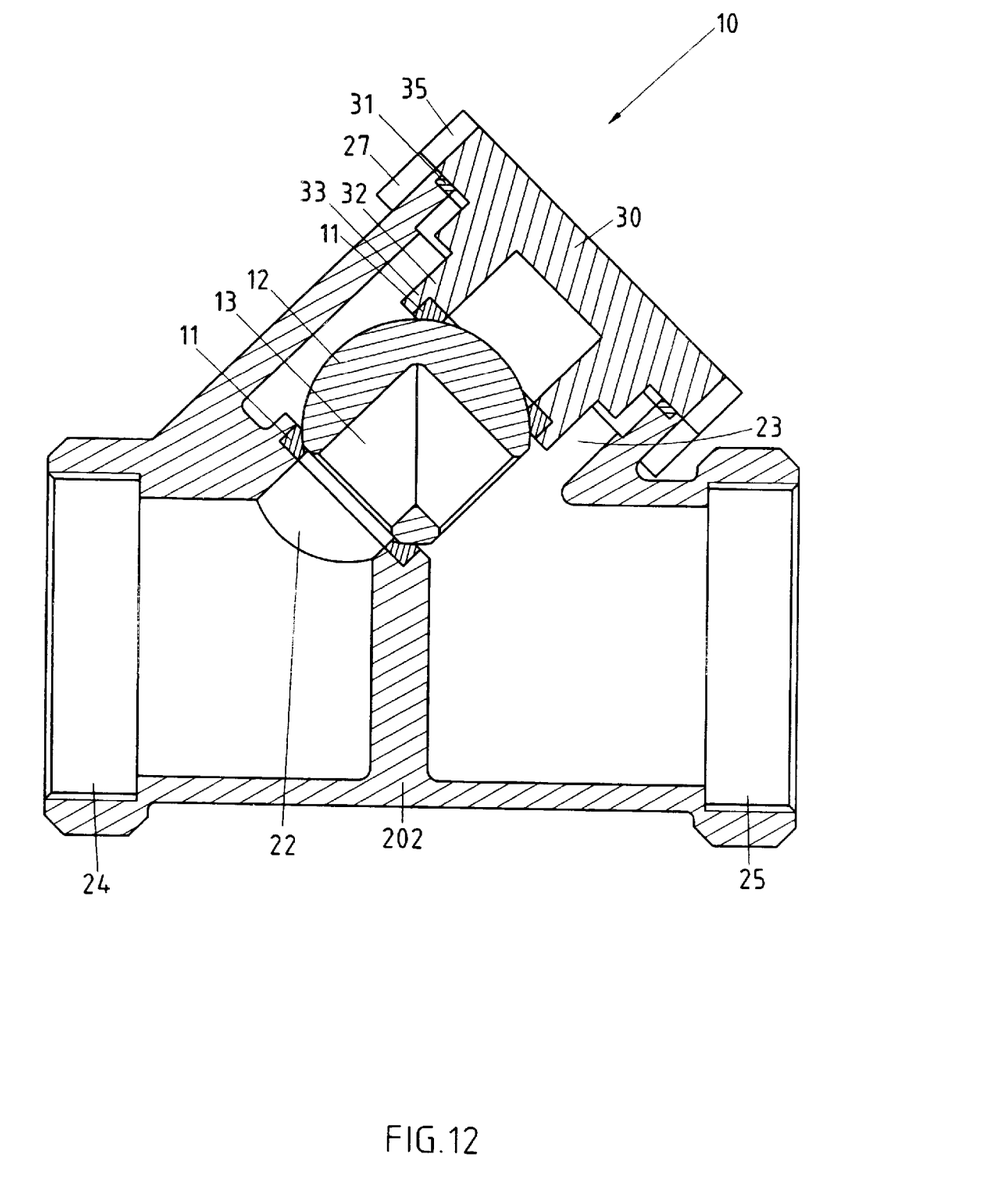
FIG. 12 shows a sectional plan view of a third embodiment of the present invention.

As shown in FIG. 12, the partition 21 of the main body 20 of the spherical valve 10 is slanted to enable the inner annular seat 22, the threaded tubular portion 24, and the outer receiving cell 23 to be in communication with another threaded tubular portion 25. The spherical valve 10 of the present invention can be thus easily repaired or replaced at a low cost.

Figure 13:
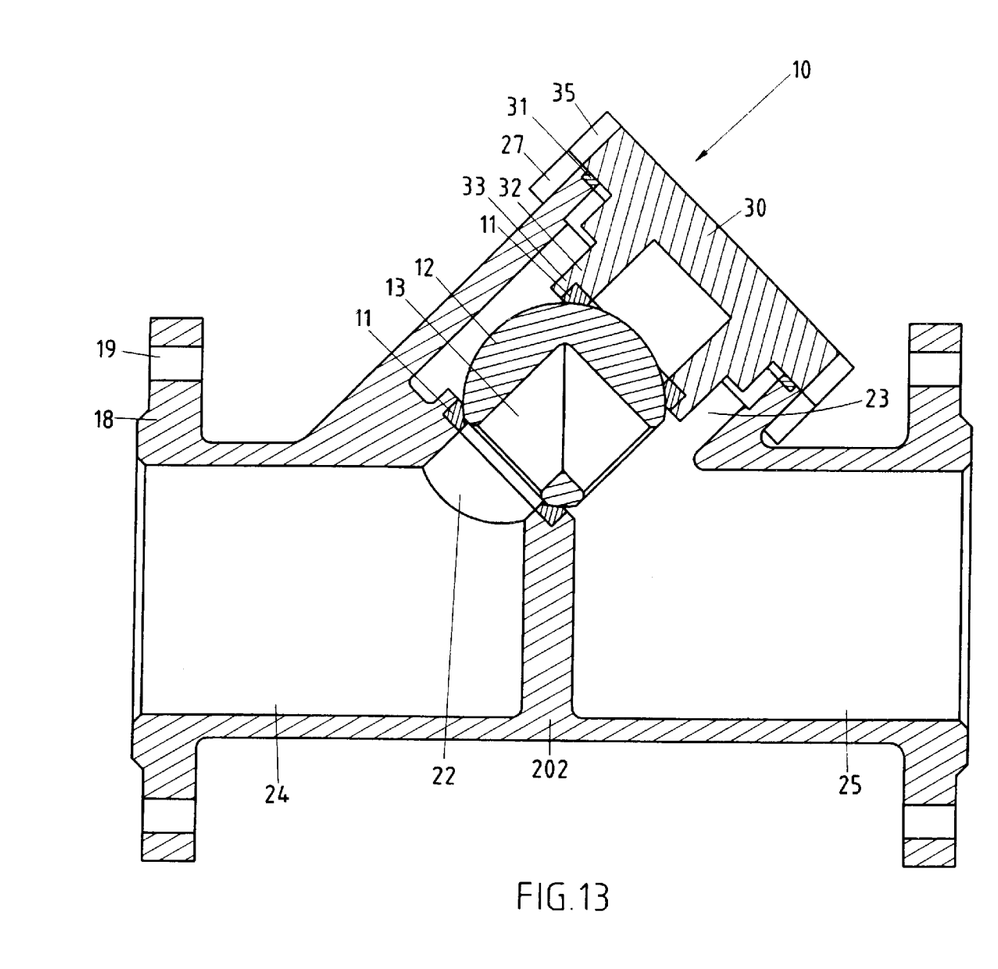
FIG. 13 shows a sectional plan view of a fourth embodiment of the present invention.

As shown in FIG. 13, the main body 20 of the spherical valve 10 is provided at both ends with a plate portion 18 which is in turn provided with a bolt hole 19, thereby enabling the spherical valve 10 to be easily replaced from a pipe line.

I claim:

1. A spherical valve comprising:

a main body of a hollow construction and having an interior which is divided by a partition into an inner annular seat and an outer receiving cell, said main body provided at one end with a threaded tubular portion in communication with said inner annular seat via said outer receiving cell, said main body further provided at another end thereof with a threaded tubular portion in communication with said outer receiving cell, said main body further provided in one side thereof with a shaft tube in communication with said outer receiving cell for pivoting a rotary shaft member, said outer receiving cell provided in a brim with a plurality of lugs, wherein each lug has a threaded through hole;

a cover corresponding in shape to said outer receiving cell and provided thereunder with a washer, said cover provided in an underside thereof with an annular body corresponding in location to said inner annular seat and having an annular clamp seat, said cover provided in the periphery with a plurality of lugs, wherein each lug has a through hole whereby said cover is fastened to said main body by a plurality of fastening bolts which are engaged with said threaded through holes of said lugs of said main body via said through holes of said lugs of said cover; and a spherical body provided in an interior with an L-shaped channel;

wherein said spherical body is located between two washers of said annular clamp seat and said inner annular seat, said spherical body being provided in the periphery with a retaining slot in which a rib of said rotary shaft member is retained, said rotary shaft member being provided at an outer end with a rotary handle for actuating said rotary shaft member so as to orient said L-shaped channel to facilitate the opening or the closing of said spherical valve.

2. The spherical valve as defined in claim 1, wherein said main body is provided at both ends thereof with a plate portion in place of said threaded tubular portion whereby said plate portion is provided with a bolt hole to facilitate fastening and unfastening of said spherical valve to a pipe line.

3. The spherical valve as defined in claim 1, wherein said cover is provided with a guide hole for mounting a pressure gauge to monitor pressure in said spherical valve.

4. The spherical valve as defined in claim 1, wherein said partition of said main body is slanted to enable said inner annular seat, said threaded tubular portion, and said outer receiving cell to be in communication with another tubular portion, thereby enabling said spherical valve to be repaired or replaced with ease.

* * * * *